United States Patent
Ishimasa (10) Patent No.: US 8,837,061 B2
(45) Date of Patent: Sep. 16, 2014

(54) LENS BARREL AND IMAGING APPARATUS

(71) Applicant: Canon Kabushiki Kaisha, Tokyo (JP)

(72) Inventor: Toru Ishimasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 13/669,821

(22) Filed: Nov. 6, 2012

(65) Prior Publication Data

US 2013/0155529 A1 Jun. 20, 2013

(30) Foreign Application Priority Data

Dec. 16, 2011 (JP) ................................ 2011-275216

(51) Int. Cl.
*G02B 7/02* (2006.01)
(52) U.S. Cl.
USPC ........................................................ 359/824

(58) Field of Classification Search
USPC .......................................................... 359/824
See application file for complete search history.

(56) References Cited

U.S. PATENT DOCUMENTS 5,166,829 A * 11/1992 Iizuka ........................... 359/699

FOREIGN PATENT DOCUMENTS

JP 2010-054783 A 3/2010

* cited by examiner

*Primary Examiner* — James Jones
(74) *Attorney, Agent, or Firm* — Fitzpatrick, Cella, Harper & Scinto (57) ABSTRACT

Provided is a lens barrel including a fourth lens group that holds a fourth lens, a second lens group that holds a second lens and is disposed closer to an object than the fourth lens group, and a drive source that drives the fourth lens group in a direction along the optical axis. The fourth lens has a notch around a portion of an outer periphery thereof. The drive source is provided in the notch.

7 Claims, 7 Drawing Sheets

LENS BARREL AND IMAGING APPARATUS

BACKGROUND OF THE INVENTION

1. Field of the Invention

The present invention relates to a lens barrel and an imaging apparatus.

2. Description of the Related Art

There has been proposed an imaging apparatus including a non-circular focus lens. For example, Japanese Patent Laid-Open No. 2010-54783 discloses an imaging apparatus in which at least a portion of the outer periphery of a focus lens is in a non-circular shape and a guide shaft is disposed within a void space.

Figure 7:
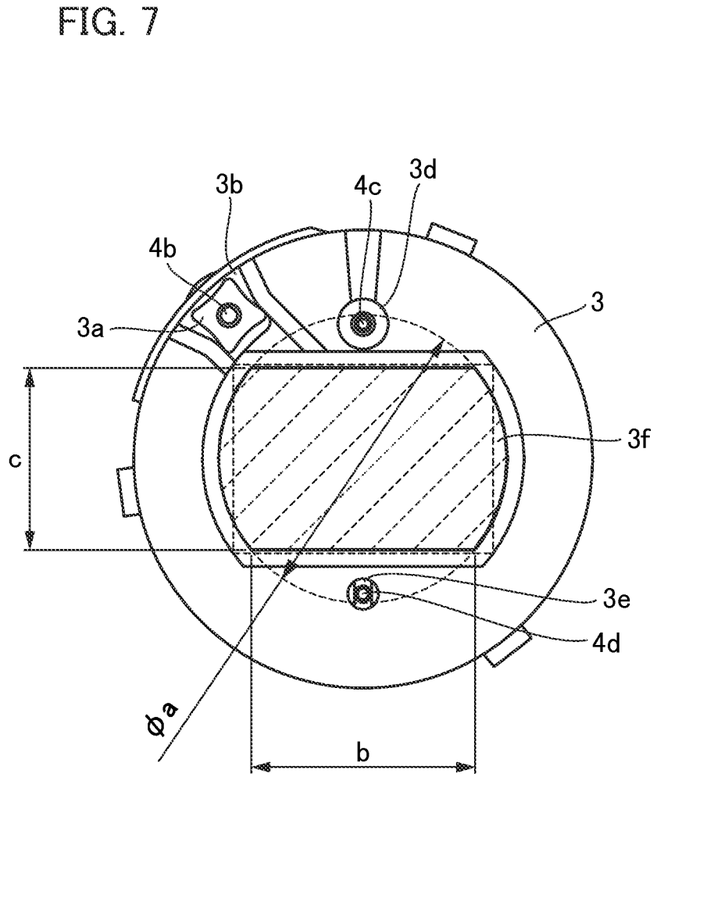
FIG. 7 is a view showing an example of the configuration of a conventional imaging apparatus.

FIG. 7 is a view showing the configuration of a rear focusing unit provided in the imaging apparatus disclosed in Japanese Patent Laid-Open No. 2010-54783. In FIG. 7, a first lens frame 3 constituting a rear focusing unit is shown. On the first lens frame 3, a lens 3f for the first lens frame, a nut 3a, a nut holding unit 3b, a guide shaft A4c, a guide shaft B4d, a loosely fitting hole 3e for a guide shaft B, a guide shaft A-receiving portion 3d, and a lead screw 4b are provided.

The lens 3f for the first lens frame has a substantially elliptical shape. The long side diameter of the lens 3f is "b" and the short side diameter thereof is "c". Specifically, the lens 3f has two notches that are formed by cutting out the outer periphery of the circular-shaped lens. The guide shaft A4c and the guide shaft B4d are provided in these notches.

However, in the imaging apparatus disclosed in Japanese Patent Laid-Open No. 2010-54783, a guide shaft is disposed within a void space that is produced by bringing a portion of an outer periphery of a focus lens into a non-circular shape, and thus, a drive source for driving the lens cannot be disposed within the space. Thus, the drive source is disposed at an outer position than the outer periphery of the lens. Consequently, the drive source cannot be efficiently laid out within the barrel of the imaging apparatus, resulting in an increase in the diameter of the barrel.

SUMMARY OF THE INVENTION

The present invention provides a lens barrel that is advantageous for decreasing the size thereof by including a drive source that drives a lens and is efficiently disposed within the barrel.

According to an aspect of the present invention, a lens barrel is provided that includes a first lens unit that holds a first lens; a second lens unit that holds a second lens and is disposed closer to an object than the first lens unit in a direction of an optical axis; and a drive unit that drives the first lens unit in a direction along the optical axis. At least the first lens among the first lens and the second lens has a notch around a portion of an outer periphery thereof. Also, at least a portion of the drive unit is provided in the notch as viewed from the direction of the optical axis.

Further features of the present invention will become apparent from the following description of exemplary embodiments with reference to the attached drawings.

DESCRIPTION OF THE EMBODIMENTS

Figure 1:
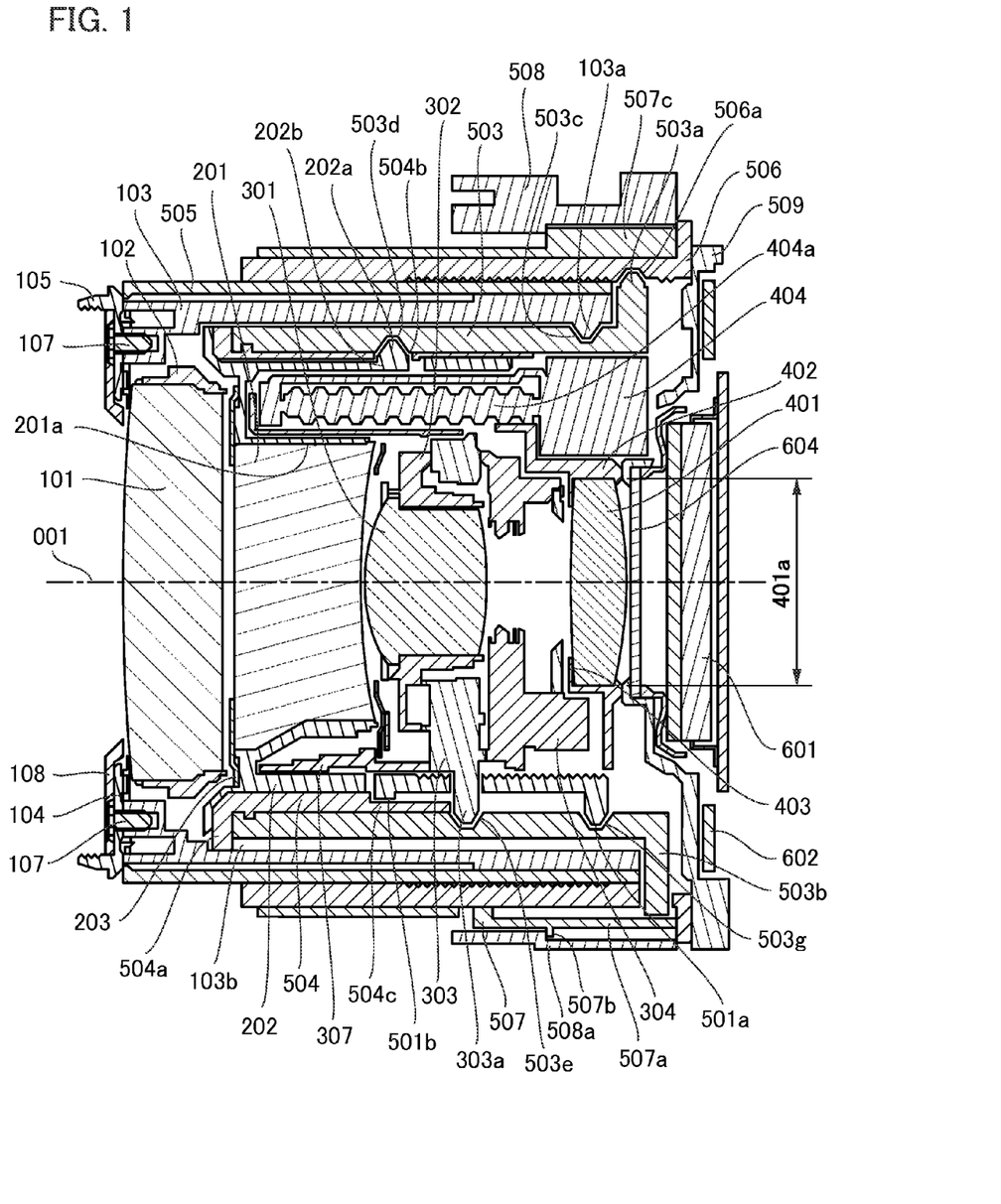
FIG. 1 is a view showing an example of the configuration of a lens barrel in a collapsed state.
Figure 2:
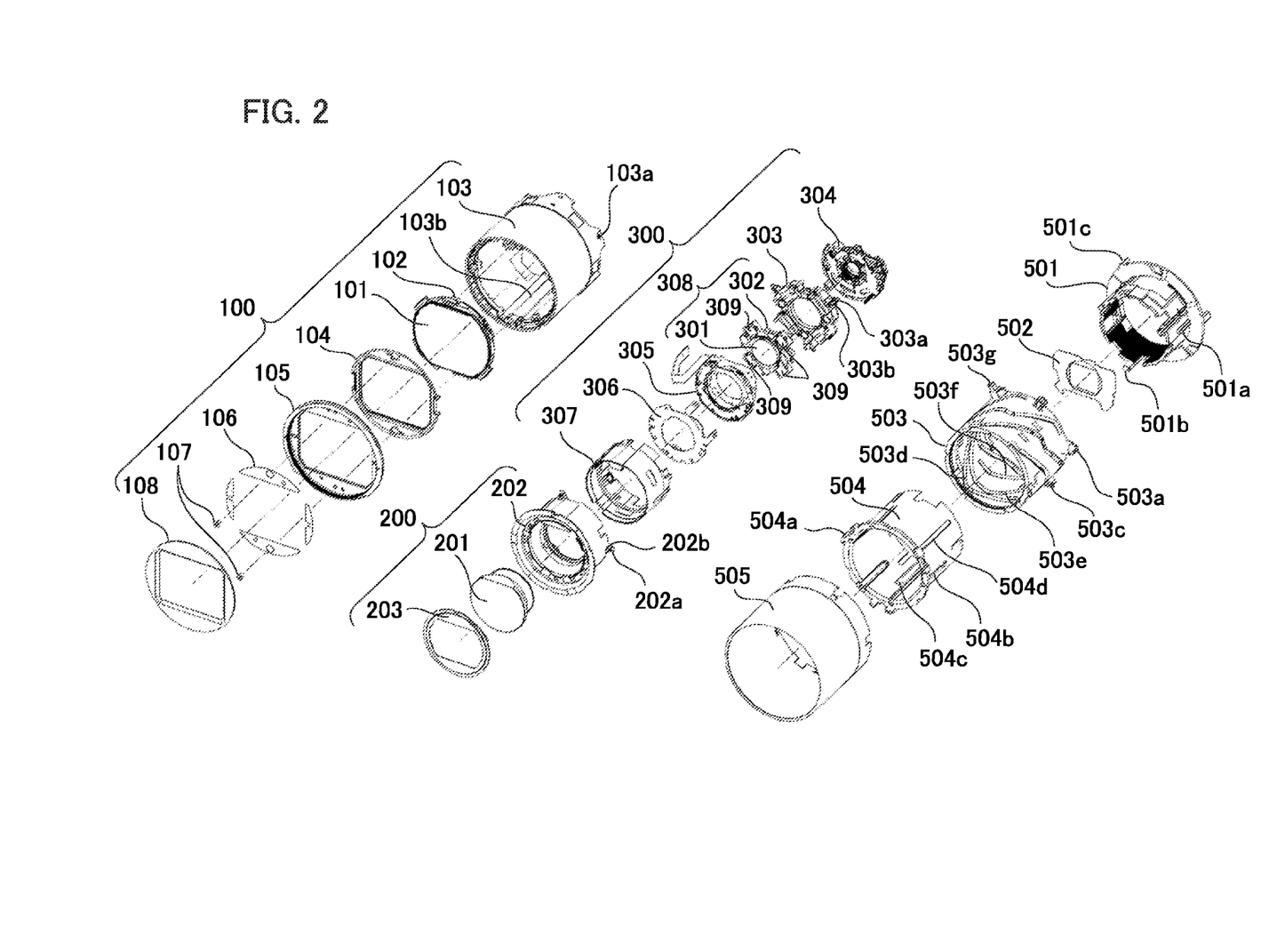
FIG. 2 is an exemplary exploded perspective view showing a lens barrel.
Figure 3:
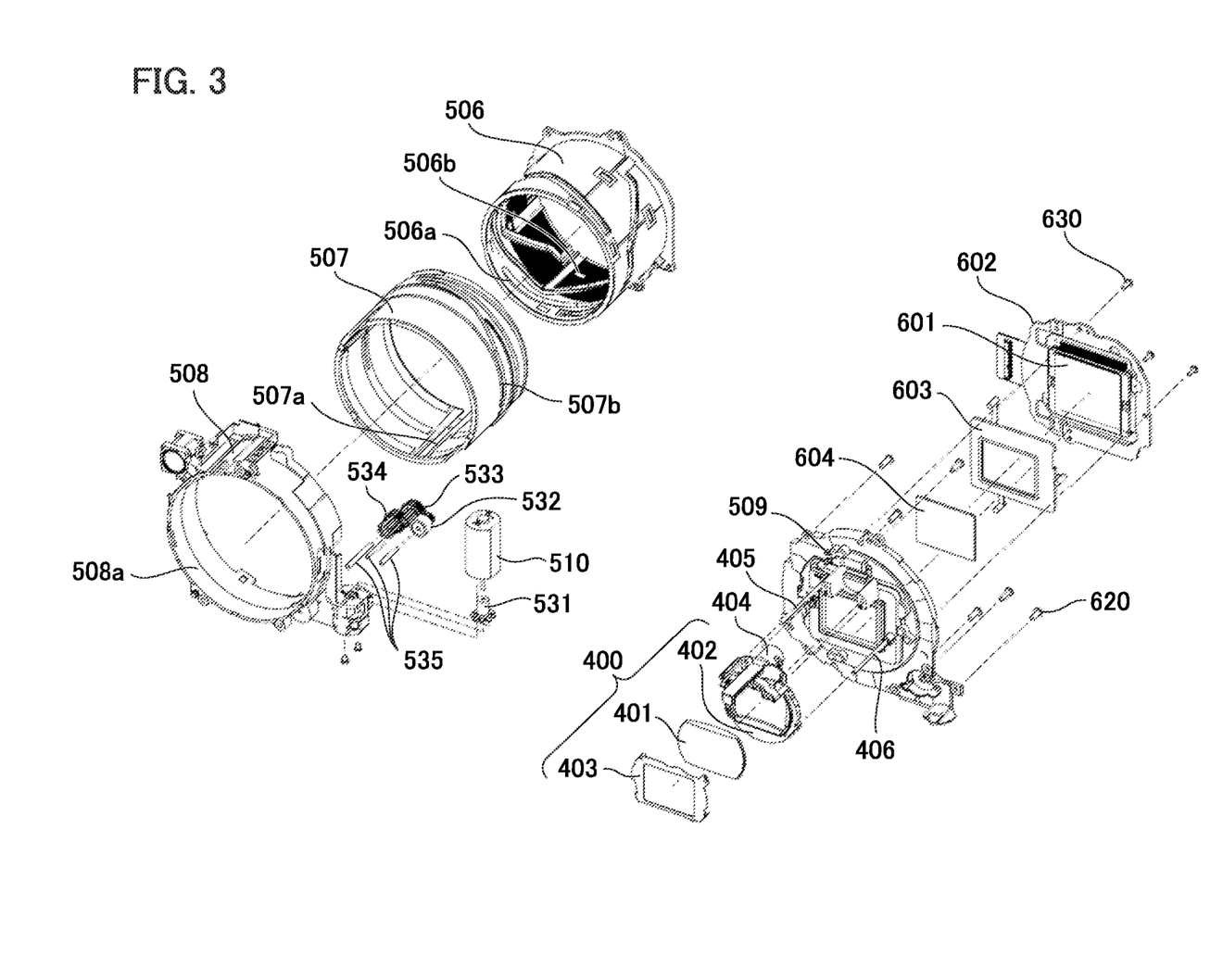
FIG. 3 is an exemplary exploded perspective view showing a lens barrel.
Figure 4:
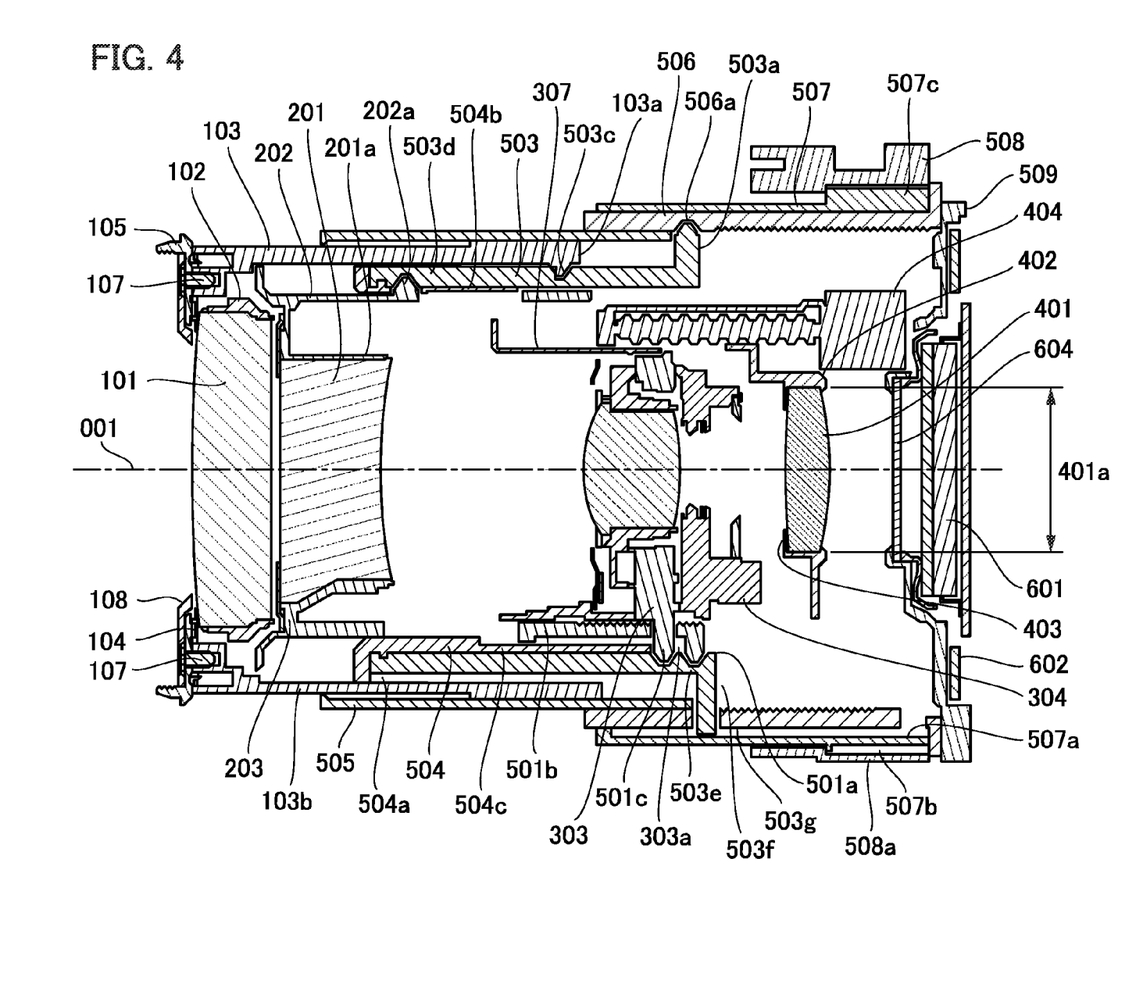
FIG. 4 is a view showing an example of the configuration of a lens barrel in an imaging state.

Hereinafter, a description will be given of the configuration of the imaging apparatus of the present embodiment with reference to FIGS. 1 to 4. FIG. 1 is a view showing an example of the configuration of a lens barrel provided in the imaging apparatus of the present embodiment. The lens barrel shown in FIG. 1 is in a collapsed state. FIG. 2 and FIG. 3 are exemplary exploded perspective views showing the lens barrel. FIG. 4 is a view showing an example of the configuration of the lens barrel in an imaging state.

A first lens group 100 has a cylindrical first lens frame 102 that holds a first lens 101 and a cylindrical first group barrel 103 that holds the first lens frame 102. Also, the first lens group 100 has a first lens rubber 104, a first lens cover 105, a double-sided adhesive tape 106, a screw 107, and a front cover 108.

Cam pins 103a that inwardly project in the radial direction and are equi-angularly spaced in the inner peripheral direction are provided on the inner peripheral surface of the first group barrel 103. Key grooves 103b that engage with linear keys 504a of a first linear barrel 504 are also provided on the inner peripheral surface of the first group barrel 103.

The first linear barrel 504 is provided on the inner peripheral surface of the first group barrel 103. While the first linear barrel 504 is pivotally mounted on a cam barrel 503 and the rotation thereof is limited by a second linear barrel 501, the first linear barrel 504 limits the rotation of the first lens group 100, a second lens group 200, and a third lens group 300 so as to linearly guide them in the direction of the optical axis.

Equi-angularly spaced key grooves 504c, 504b, and 504d are provided on the inner peripheral surface of the first linear barrel 504. The key groove 504c is a key groove that engages with a linear key 501b of the second linear barrel 501 and limits the rotation of the linear key 501b. The key groove 504b is a through-key groove that limits the rotation of the linear key 202b of the second lens frame 202. The key groove 504d is a through-key groove that limits the rotation of a linear key 303b of a third lens frame 303. Note that reference numeral 502 denotes a moving mask and reference numeral 505 denotes a cover barrel.

The linear keys 504a are provided on the outer peripheral surface of the first linear barrel 504. The linear keys 504a outwardly project in the radial direction and are equi-angularly spaced in the outer peripheral direction so as to engage with the key grooves 103b of the first group barrel 103. The first linear barrel 504 engages with the inner surface of the cam barrel 503. Also, the first linear barrel 504 is bayonet coupled with the cam barrel 503 so as to be held rotatably relative to the cam barrel 503.

Cam pins 501a, a linear key 501b, and a linear key 501c are provided on the outer peripheral surface of the second linear barrel 501. The cam pins 501a that outwardly project in the radial direction and are equi-angularly spaced in the outer peripheral direction are provided on the outer peripheral surface of the second linear barrel 501. The linear key 501b engages with the key groove 504c of the first linear barrel 504. The linear key 501c engages with a key groove 506b of a fixed barrel 506.

Cam grooves 503d, 503f, and 503e, which are equi-angularly spaced to each other, are provided on the inner peripheral surface of the cam barrel 503. A cam pin 202a of a second lens frame 202 is inserted into the cam groove 503d. The cam pin 501a of the second linear barrel 501 is inserted into the cam groove 503f. A cam pin 303a of the third lens frame 303 is inserted into the cam groove 503e.

Also, a cam groove 503c, a cam pin 503a, and a rotary key 503g, which are equi-angularly spaced to each other, are provided on the outer peripheral surface of the cam barrel 503. The cam pin 103a of the first lens frame 103 is inserted into the cam groove 503c. A cam groove 506a of the fixed barrel 506 is inserted into the cam pin 503a. The rotary key 503g engages with a key groove 507a of a drive ring 507.

The key groove 506b and the cam groove 506a, which are equi-angularly spaced to each other, are provided on the inner peripheral surface of the fixed barrel 506. The key groove 506b limits the rotation of the linear key 501c of the second linear barrel 501. The cam pin 503a of the cam barrel 503 is inserted into the cam groove 506a. Also, the outer peripheral surface of the fixed barrel 506 is engaged with the inner peripheral surface of the drive ring 507 so as to rotatably hold the drive ring 507.

Equi-angularly spaced key grooves 507a are provided on the inner peripheral surface of the drive ring 507. The key groove 507a engages with the rotary key 503g of the cam barrel 503. Also, a flange 507b and a gear part 507c are provided on the outer peripheral surface of the drive ring 507. The flange 507b limits the movement of the drive ring 507 in the direction of the optical axis. The gear part 507c converts a driving force applied by a drive source into a rotational force.

An engagement portion 508a that engages with the flange 507b of the drive ring 507 is provided on the inner peripheral surface of a drive ring cover 508. The movement of the drive ring 507 in the direction of the optical axis is limited by the drive ring cover 508, the fixed barrel 506, and a sensor holder 509.

The third lens group 300 is disposed inside the first linear barrel 504 and the second linear barrel 501. The third lens group 300 includes a light quantity adjusting unit 304, an IS_FPC unit 305, an IS cover 306, a light-shielding barrel 307, a camera-shake compensation lens group 308, and a base plate 303 of the camera-shake compensation lens group 308. The camera-shake compensation lens group 308 includes a camera-shake compensation lens 301, a third lens holding frame 302, and a driving unit 309. The driving unit 309 drives the camera-shake compensation lens group 308 in a direction perpendicular to the optical axis 001 to compensate an image blur. The camera-shake compensation lens group 308 is movable within a region excluding the lead screw (drive member) 404a which is extended to the object in parallel to an optical axis 001 from the stepping motor 404. Equi-angularly spaced cam pins 303a are provided on the outer peripheral surface of the base plate 303. The diameter of the camera-shake compensation lens 301 is smaller than that of a second lens 201 and a fourth lens 401.

A fourth lens group 400 is disposed towards an image sensing element 601 of the third lens group 300. The fourth lens group 400 includes a fourth lens 401, a fourth lens holding frame 402, and a light shielding mask 403. Specifically, the fourth lens group 400 functions as a first lens unit that holds a first lens (the fourth lens 401). In the present embodiment, the fourth lens 401 is a focus lens. The rotation of the fourth lens group 400 is limited by a main guide 405 and a sub guide 406. The fourth lens group 400 is disposed such that it is movable in the direction of the optical axis by a stepping motor 404 (drive unit). In the present embodiment, the drive source that moves the fourth lens group 400 in the direction of the optical axis is the stepping motor 404 but a drive source such as VCM may also be used.

The second lens group 200 includes a second lens 201, a second lens frame 202, and a second lens mask 203. The second lens frame 202 has a cylindrical shape and holds the second lens 201. Specifically, the second lens group 200 functions as a second lens unit that holds a second lens (the second lens 201) and is disposed closer to an object than the fourth lens group 400 in the direction of the optical axis.

Cam pins 202a that outwardly project in the radial direction and are equi-angularly spaced in the outer peripheral direction are provided on the outer peripheral surface of the second lens frame 202. The linear key 202b that engages with the key groove 504b of the first linear barrel 504 is provided at the root portion of the cam pin 202a.

The image sensing element 601 is fixed to a sensor plate 602. Also, the image sensing element 601 is fixed to the sensor holder 509 by a screw 630. The image sensing element 601 is fixed to the sensor holder 509 such that a protective glass 604 is pressed against the sensor holder 509 with the aid of the elasticity of a sensor rubber 603. In the present embodiment, the sensor holder 509 and the drive ring cover 508 are fixed by sandwiching the fixed barrel 506 using a screw 620. With this arrangement, the barrel is unitized.

Here, when the barrel shifts from the collapsed state to the imaging state, gears 531 to 534 firstly are rotated by the power from a drive source 510, and then the drive ring 507 is rotationally driven. When the drive ring 507 is rotationally driven, the cam barrel 503 is unwound while being rotated in the direction of the optical axis by the action of the drive ring 507 and the fixed barrel 506.

The first linear barrel 504 and the second linear barrel 501 are held by the cam barrel 503 in a relatively movable state. Also, the rotation of the first linear barrel 504 and the second linear barrel 501 is limited by the fixed barrel 506. Thus, when the cam barrel 503 is rotated, the first linear barrel 504 and the second linear barrel 501 are unwound while being linearly moved in the direction of the optical axis.

The first lens group 100, the second lens group 200, and the third lens group 300 are unwound while being linearly moved in the direction of the optical axis by the action of the first linear barrel 504, the second linear barrel 501, and the cam barrel 503. Also, the fourth lens group 400 is held so as to be movable in the direction of the optical axis by a stepping motor (drive source) 404 (drive unit).

Also, the rotation of the fourth lens group 400 is limited by the main guide 405 and the sub guide 406. The fourth lens group 400 is unwound while being linearly moved in the direction of the optical axis independent of the movement of the cam barrel 503. In order to make the fourth lens group 400 linearly move in the direction of the optical axis, the stepping motor 404 (drive unit) includes a lead screw (drive member) 404a that extends to the object in parallel to an optical axis 001.

With this configuration, the lens groups are unwound from the collapsed position toward the object by the rotation of the drive ring 507. With this arrangement, the barrel shifts from the collapsed state to the imaging state. A distance between the lens groups is appropriately adjusted by the action of the cam barrel 503 and the fixed barrel 506. With this arrangement, zooming is performed by the lens barrel.

Figure 5:
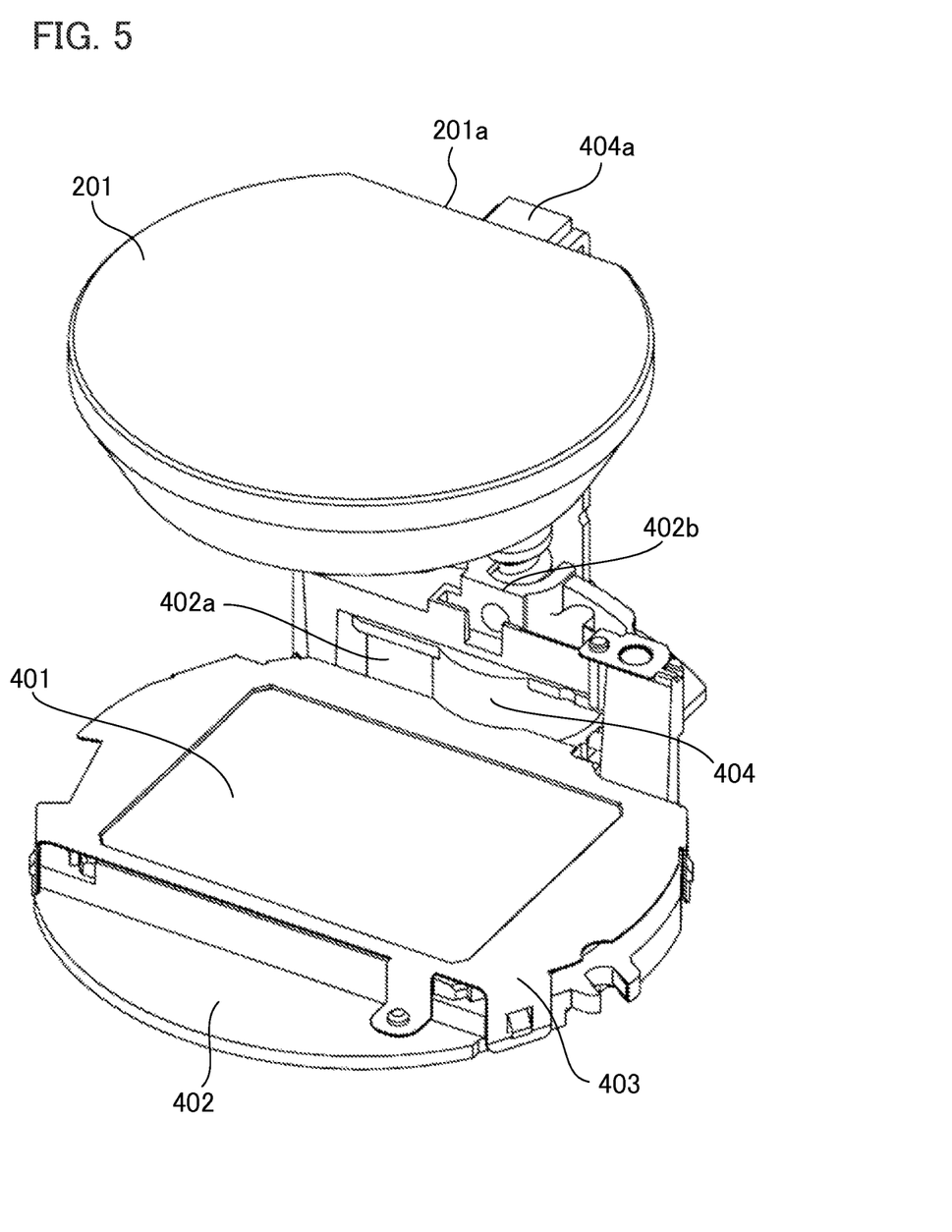
FIG. 5 is an exemplary perspective view showing a fourth lens group.
Figure 6:
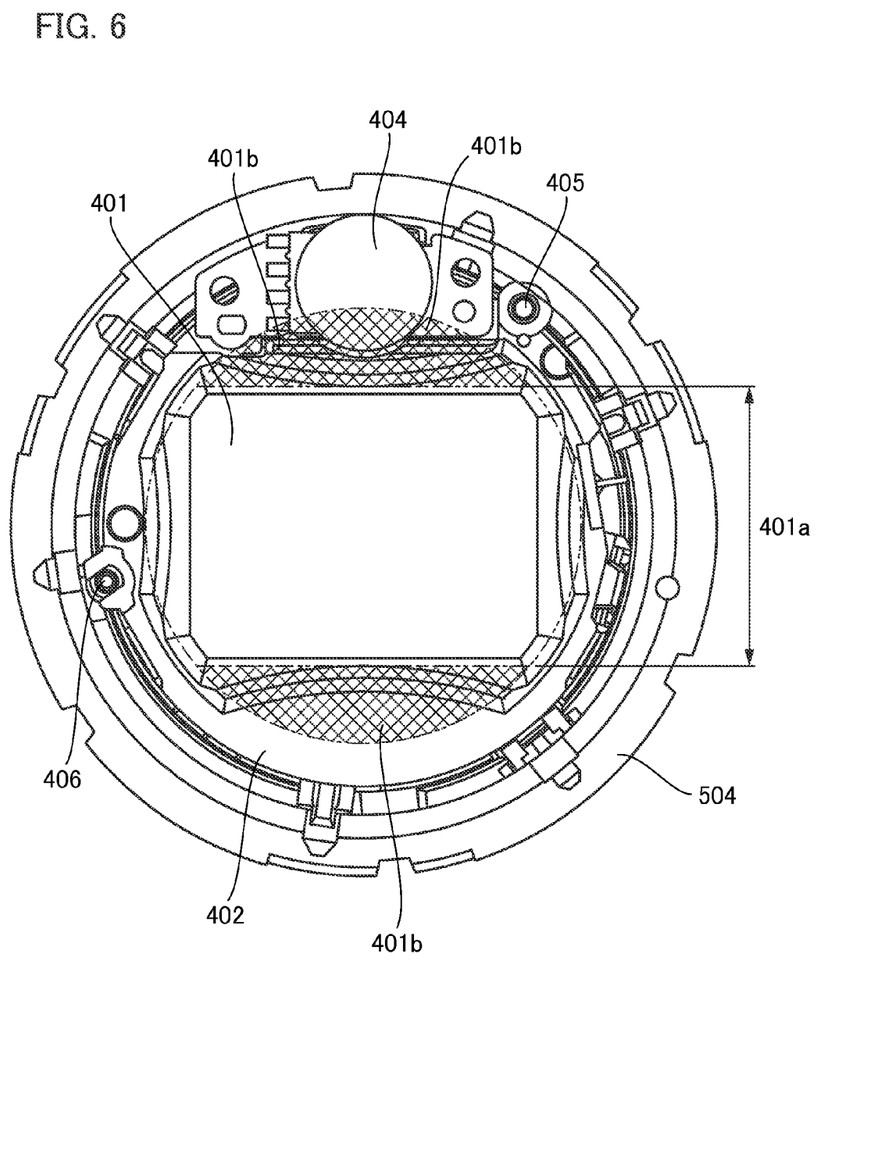
FIG. 6 is an exemplary view showing a fourth lens group as viewed from the bottom.

Next, a description will be given of the configuration of the fourth lens 400 provided in the lens barrel of the present embodiment and the layout of its peripheral components with reference to FIG. 1, FIG. 5, and FIG. 6. FIG. 5 is an exemplary perspective view showing a fourth lens group. FIG. 6 is an exemplary view showing a fourth lens group as viewed from the bottom.

As shown in FIG. 6, the fourth lens 401 has a notch 401b that is formed by cutting out a portion of a circular-shaped outer periphery. In other words, the fourth lens 401 has a non-circular shape having a narrow side of 401a. The notch 401b is a void space formed in the same plane as the fourth lens 401. As in the fourth lens 401, the second lens 201 also has a notch 201a (see FIG. 1) that is formed by cutting out a portion of a circular-shaped outer periphery. In order to produce effects of the present invention of decreasing the size of the barrel by efficiently disposing a drive source that drives a lens within the barrel, at least the fourth lens 401 among the fourth lens 401 and the second lens 201 may have a notch.

In this example, the notch 401b is the portion excluding the used region of the fourth lens 401. The notch 201a is the portion excluding the used region of the second lens 201. Also, the notch 401b is formed by cutting out the fourth lens 401 in the short direction. The notch 201a is formed by cutting out the second lens 201 in the short direction. In other words, each of the fourth lens 401 and the second lens 201 are cut out in a range of holding its optical characteristics.

As shown in FIG. 5 and FIG. 6, in the lens barrel of the present embodiment, the stepping motor 404 is provided in a void space that is formed in the notch 401b, that is, formed in the same plane as the fourth lens 401.

As shown in FIG. 5, the fourth lens frame 402 that holds the fourth lens 401 includes a connecting unit 402b that connects the fourth lens frame 402 to the stepping motor 404. The connecting unit 402b has an opening 402a in a part of its wall. At least a portion of the stepping motor 404 is housed in the opening 402a.

Note that the main guide 405 and the sub guide 406 are disposed in spaces between the second linear barrel 501 and the first linear barrel 504 and among the second lens group 200, the third lens group 300, and the fourth lens group 400.

According to the lens barrel of the present embodiment described above, at least a portion of the stepping motor 404 of the fourth lens 401 can be housed in the notch 401b provided in the fourth lens 401. Thus, the lens barrel can be reduced in size.

Furthermore, the notch 201a may also be provided in the second lens 201, so that a lead screw (drive member) 404a can extend in parallel to the optical axis 001 through the notch 201a. Also, the diameter of the camera-shake compensation lens 301 is smaller than that of the second lens 201 and the fourth lens 401. Thus, even when at least a portion of the drive source 404 is disposed in the opening 402a and a lead screw 404a is disposed in the notch 201a, there is no need to cut out the camera-shake compensation lens 301. With this arrangement, it can be ensured that the fourth lens group 400 is driven over a longer distance along the optical axis. Consequently, excellent optical characteristics can be obtained.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-275216 filed Dec. 16, 2011, which is hereby incorporated by reference herein in its entirety.

What is claimed is:

1. A lens barrel comprising:
a first lens unit that holds a first lens;
a second lens unit that holds a second lens and is disposed closer to an object than the first lens unit in a direction of an optical axis; and
a drive unit that drives at least one of the first lens unit and the second lens unit in a direction along the optical axis,
wherein the first lens has a first notch portion provided on an outer periphery thereof, and the second lens has a second notch portion provided on an outer periphery thereof,
wherein the drive unit has a motor and a lead screw that extends toward the object parallel to the optical axis, and
wherein at least a portion of the motor is located in the first notch portion as viewed from the direction of the optical axis, and at least a portion of the lead screw is located in the second notch portion as viewed from the direction of the optical axis.

2. The lens barrel according to claim 1, wherein the first notch portion is provided to maintain an optical characteristic of the first lens, and wherein the second notch portion is provided to maintain an optical characteristic of the second lens.

3. The lens barrel according to claim 1, wherein the first notch portion is formed by cutting out the first lens, and the second notch portion is formed by cutting out the second lens.

4. The lens barrel according to claim 1, wherein the first lens unit comprises a lens holding frame that holds the first lens, the lens holding frame has a connecting unit that connects the lens holding frame to the motor, and at least a portion of the motor is housed in an opening provided in the connecting unit.

5. The lens barrel according to claim 1, further comprising, a third lens unit which holds a third lens,
wherein the diameter of the third lens is smaller than that of the first lens and the second lens, and the third lens is disposed between the first and second lens units in the direction of the optical axis, and
wherein the third lens lacks a notch portion on an outer periphery thereof.

6. The lens barrel according to claim 5, further comprising, a second drive unit which drives the third lens unit in a direction perpendicular to the optical axis,
wherein the second drive unit is disposed parallel to the optical axis within a region excluding a movable region of the third lens unit.

7. An imaging apparatus comprising:
a first lens unit that holds a first lens;
a second lens unit that holds a second lens and is disposed closer to an object than the first lens unit in a direction of an optical axis; and
a drive unit that drives at least one of the first lens unit and the second lens unit in a direction along the optical axis, wherein the first lens has a first notch portion provided on an outer periphery thereof, and the second lens has a second notch portion provided on an outer periphery thereof, wherein the drive unit has a motor and a lead screw that extends toward the object parallel to the optical axis, and wherein at least a portion of the motor is located in the first notch portion as viewed from the direction of the optical axis, and at least a portion of the lead screw is located in the second notch portion as viewed from the direction of the optical axis.

* * * * *